(12) United States Patent
Fukatsu et al.

(10) Patent No.: US 10,218,029 B2
(45) Date of Patent: Feb. 26, 2019

(54) ELECTRODE FOR SECONDARY BATTERY, SECONDARY BATTERY, AND MANUFACTURING METHOD OF THE ELECTRODE AND THE SECONDARY BATTERY

(71) Applicant: NEC ENERGY DEVICES, LTD., Sagamihara-shi, Kanagawa (JP)

(72) Inventors: Kimiyoshi Fukatsu, Kanagawa (JP); Tomohiko Hayashi, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 93 days.

(21) Appl. No.: 15/121,428

(22) PCT Filed: Jan. 16, 2015

(86) PCT No.: PCT/JP2015/051020
§ 371 (c)(1),
(2) Date: Aug. 25, 2016

(87) PCT Pub. No.: WO2015/129320
PCT Pub. Date: Sep. 3, 2015

(65) Prior Publication Data
US 2016/0359189 A1 Dec. 8, 2016

(30) Foreign Application Priority Data
Feb. 28, 2014 (JP) .................. 2014-038063

(51) Int. Cl.
*H01M 10/0525* (2010.01)
*H01M 10/0585* (2010.01)
(Continued)

(52) U.S. Cl.
CPC ....... *H01M 10/0525* (2013.01); *H01M 2/021* (2013.01); *H01M 2/0237* (2013.01);
(Continued)

(58) Field of Classification Search
CPC ............ H01M 10/04; H01M 10/0413; H01M 10/0436; H01M 10/0525; H01M 10/056;
(Continued)

(56) References Cited

U.S. PATENT DOCUMENTS

2005/0214647 A1  9/2005  Tanaka et al.
2006/0006063 A1  1/2006  Tanaka et al.
(Continued)

FOREIGN PATENT DOCUMENTS

JP  2003-151535 A  5/2003
JP  2003-208890 A  7/2003
(Continued)

OTHER PUBLICATIONS

International Search Report of PCT/JP2015/051020, dated Mar. 17, 2015. [PCT/ISA/210].

*Primary Examiner* — Carlos Barcena
(74) *Attorney, Agent, or Firm* — Sughrue Mion, PLLC

(57) ABSTRACT

Electrode 6 for a secondary battery to be laminated with another type of electrode 1, with separator 20 interposed therebetween, to constitute a battery electrode assembly, is comprised of collector 8 and active material layer 7 formed on collector 8, and electrode 6 includes a coated part in which active material layer 7 is formed on collector 8 and an uncoated part in which active material layer 7 is not formed on collector 8. Active material layer 7 includes, in at least a part of the outer peripheral portion of the coated part, high density part 7*a* having a smaller thickness and a higher density than those of a portion other than the outer peripheral portion.

10 Claims, 13 Drawing Sheets

(51) Int. Cl.

| | | |
|---|---|---|
| *H01M 10/056* | (2010.01) | |
| *H01M 10/04* | (2006.01) | |
| *H01M 4/04* | (2006.01) | |
| *H01M 4/131* | (2010.01) | |
| *H01M 4/133* | (2010.01) | |
| *H01M 4/134* | (2010.01) | |
| *H01M 4/1391* | (2010.01) | |
| *H01M 4/1393* | (2010.01) | |
| *H01M 4/1395* | (2010.01) | |
| *H01M 4/38* | (2006.01) | |
| *H01M 4/505* | (2010.01) | |
| *H01M 4/525* | (2010.01) | |
| *H01M 4/583* | (2010.01) | |
| *H01M 4/62* | (2006.01) | |
| *H01M 4/66* | (2006.01) | |
| *H01M 2/16* | (2006.01) | |
| *H01M 2/02* | (2006.01) | |
| *H01M 4/139* | (2010.01) | |
| *H01M 10/0587* | (2010.01) | |
| *H01M 4/02* | (2006.01) | |

(52) U.S. Cl.
CPC ......... *H01M 2/162* (2013.01); *H01M 2/1686* (2013.01); *H01M 4/043* (2013.01); *H01M 4/0404* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/386* (2013.01); *H01M 4/387* (2013.01); *H01M 4/505* (2013.01); *H01M 4/525* (2013.01); *H01M 4/583* (2013.01); *H01M 4/622* (2013.01); *H01M 4/623* (2013.01); *H01M 4/625* (2013.01); *H01M 4/662* (2013.01); *H01M 10/04* (2013.01); *H01M 10/0413* (2013.01); *H01M 10/0436* (2013.01); *H01M 10/056* (2013.01); *H01M 10/0585* (2013.01); *H01M 4/139* (2013.01); *H01M 10/0587* (2013.01); *H01M 2004/021* (2013.01); *H01M 2220/10* (2013.01); *H01M 2220/20* (2013.01); *H01M 2220/30* (2013.01)

(58) Field of Classification Search
CPC ......... H01M 10/0585; H01M 10/0587; H01M 2004/021; H01M 2220/10; H01M 2220/20; H01M 2220/30; H01M 2/021; H01M 2/0237; H01M 2/162; H01M 2/1686; H01M 4/0404; H01M 4/043; H01M 4/131; H01M 4/133; H01M 4/134; H01M 4/139; H01M 4/1391; H01M 4/1393; H01M 4/1395; H01M 4/386; H01M 4/387; H01M 4/505; H01M 4/525; H01M 4/583; H01M 4/622; H01M 4/623; H01M 4/625; H01M 4/662
See application file for complete search history.

(56) References Cited

U.S. PATENT DOCUMENTS

| | | |
|---|---|---|
| 2006/0008702 A1 | 1/2006 | Cheon et al. |
| 2012/0058375 A1 | 3/2012 | Tanaka et al. |

FOREIGN PATENT DOCUMENTS

| | | |
|---|---|---|
| JP | 2005-277064 A | 10/2005 |
| JP | 2006-12835 A | 1/2006 |
| JP | 2006-24710 A | 1/2006 |
| JP | 2006-147392 A | 6/2006 |
| JP | 2012-74359 A | 4/2012 |
| JP | 2012-164470 A | 8/2012 |
| JP | 2013-171669 A | 9/2013 |
| JP | 2014-120293 A | 6/2014 |
| WO | 2013/187172 A1 | 12/2013 |

ELECTRODE FOR SECONDARY BATTERY, SECONDARY BATTERY, AND MANUFACTURING METHOD OF THE ELECTRODE AND THE SECONDARY BATTERY

CROSS REFERENCE TO RELATED APPLICATIONS

This application is a National Stage of International Application No. PCT/JP2015/051020 filed Jan. 16, 2015, claiming priority based on Japanese Patent Application No. 2014-038063, filed Feb. 28, 2014, the contents of all of which are incorporated herein by reference in their entirety.

TECHNICAL FIELD

The present invention relates to a secondary battery in which a positive electrode and a negative electrode are laminated with a separator interposed therebetween, an electrode for secondary battery used therefor, and a manufacturing method of the secondary battery and the secondary battery electrode.

BACKGROUND ART

The secondary battery is now widely used not only as a power source for portable devices such as a mobile phone, a digital camera, or a laptop computer but also as a vehicle or household power source. Among others, a lithium ion secondary battery high in energy density and light in weight is an energy storage device that has become essential for everyday life.

The secondary batteries can be largely classified into a wound type and a laminated type. The battery electrode assembly of the wound-type secondary battery has a structure in which a long positive electrode sheet and a long negative electrode sheet are wound a plurality of times with a separator interposed therebetween to separate the positive and negative electrodes. The battery electrode assembly of the laminated-type secondary battery has a structure in which a positive electrode sheet and a negative electrode sheet are alternately laminated with a separator interposed therebetween repeatedly to separate the positive and negative electrodes from each other. The positive electrode sheet and the negative electrode sheet have coated parts in which active material layers (including case of mixed agent of active material and binder or conductor material) are formed on a collector and uncoated parts in which no active material layer is formed because an electrode terminal is connected.

In both the wound type secondary battery and the laminated type secondary battery, the battery electrode assembly is sealed together with an electrolyte in an exterior container (exterior case). One end of a positive electrode terminal is electrically connected to the uncoated part of the positive electrode sheet while the other end is pulled out of the exterior container, and one end of a negative electrode terminal is electrically connected to the uncoated part of the negative electrode sheet while the other end extends out of the exterior container. The secondary battery tends to increase in capacity year by year, which is accompanied by an increase in heat generation when a short circuit occurs, thus increasing a danger. Therefore, battery safety measure has become increasingly important.

As the example of the safety measure, there is known a technology for forming an insulating member on a boundary portion between the coated part and the uncoated part in order to prevent a short circuit between the positive electrode and the negative electrode (Patent Document 1).

RELATED ART DOCUMENT

Patent Document

Patent Document 1: JP2012-164470A
Patent Document 2: WO2013/187172A1

SUMMARY OF INVENTION

Problem to be Solved by the Invention

According to a technology disclosed in Patent Document 1, as illustrated in FIG. 19, there is disposed on positive electrode collector 3 of positive electrode 1 insulating material 40 for covering boundary portion 4a between a coated part in which positive electrode active layer 2 is formed and an uncoated part in which no positive electrode active layer is 2 is formed. In the laminated type secondary battery, insulating members 40 are repeatedly stacked at the same position seen in plane. Consequently, the thickness of the battery electrode assembly at the position where insulating member 40 is disposed is partially larger, thus reducing an energy density per volume.

In the secondary battery, preferably, the battery electrode assembly is secured by a tape or the like, and uniform pressure is applied in order to stabilize electric characteristics or reliability. However, when an insulating material similar to that described in Patent document 1 is used in the laminated type secondary battery, a difference in thickness between a portion in which insulating member 40 is present and a portion in which insulating member 40 is not present makes it impossible to apply uniform pressure to the battery electrode assembly thus creating the possibility that the quality of the battery will be reduced, such as increased variability of the electric characteristics, or a reduced cycle characteristics.

Therefore, there has been proposed a configuration for preventing a partial increase in thickness of the battery electrode assembly by partially thinning the electrode (positive electrode) on which the insulating member is formed (Patent Document 2). However, since a reduction in quality of the battery is prevented by eliminating any partial increase in thickness of the battery electrode assembly, the freedom of electrode designing (e.g., freedom of shape or thickness of positive electrode) is limited. Thus, for example, when it is desired that the positive electrode be formed into a flat shape for some reason, there is still a need to develop a novel secondary battery electrode capable of preventing a partial increase in thickness of the battery electrode assembly as in the case of Patent Document 1 and improving the quality of the battery more.

The present invention has an object of solving the aforementioned problems and providing a secondary battery electrode capable of reducing the amount of volume increase and deformation of a battery electrode assembly to improve reliability even when an insulating member is used to prevent short circuits between electrodes, and further improving the performance of the battery, a secondary battery using the electrode, and a manufacturing method of the electrode and the secondary battery.

Means to Solve the Problem

According to the present invention, an electrode for a secondary battery to be laminated with another type of electrode, with a separator interposed therebetween, in order to constitute a battery electrode assembly, is comprised of a collector and an active material layer formed on the collector, and the electrode includes a coated part in which an active material layer is formed on the collector and an uncoated part in which no active material layer is formed on the collector. The active material layer includes, in at least a part of the outer peripheral portion of the coated part, a high density part having a smaller thickness and a higher density than those of a portion other than the outer peripheral portion.

A secondary battery according to the present invention includes a battery electrode assembly including the aforementioned electrode for the secondary battery, which is used as a negative electrode, the separator, and a positive electrode alternately laminated with the negative electrode, with the separator interposed therebetween, an exterior container for housing the battery electrode assembly, and an electrolyte housed together with the battery electrode assembly in the exterior container.

According to the present invention, a method for manufacturing an electrode for a secondary battery, which is laminated with another type of electrode, with a separator interposed therebetween, in order to constitute a battery electrode assembly, includes the step of forming an active material layer in a part of a collector to provide a coated part in which the active material layer is formed, and an uncoated part in which the active material layer is not formed, and the step of locally pressing and compressing at least a part of an outer peripheral portion of the coated part to form a high density part small in thickness and high in density.

According to the present invention, a method for manufacturing a secondary battery includes each step of the aforementioned method for manufacturing the electrode for the secondary battery, which is carried out to form a negative electrode, the step of alternately laminating the negative electrode and a positive electrode, with the separator interposed therebetween, to form a battery electrode assembly, and the step of housing the battery electrode assembly and an electrolyte in an exterior container to seal the exterior container.

Advantageous Effects of Invention

According to the secondary battery electrode and the secondary battery of the present invention, even when an insulating member is used to prevent short circuits between electrodes, reliability can be improved by reducing the amount of volume increase and deformation of the battery electrode assembly, and the performance of the battery can be improved more.

DESCRIPTION OF EXEMPLARY EMBODIMENTS

Hereinafter, the exemplary embodiments of the present invention will be described with reference to the drawings.

[Basic Structure of Secondary Battery]

Figure 1A:
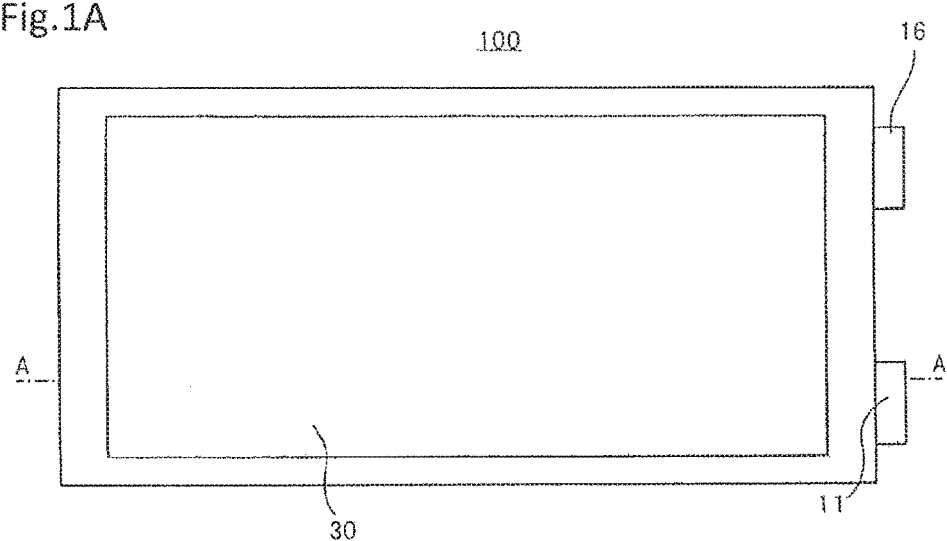
FIG. 1A is a plan view illustrating the basic structure of a laminated type secondary battery according to an exemplary embodiment of the present invention.
Figure 1B:
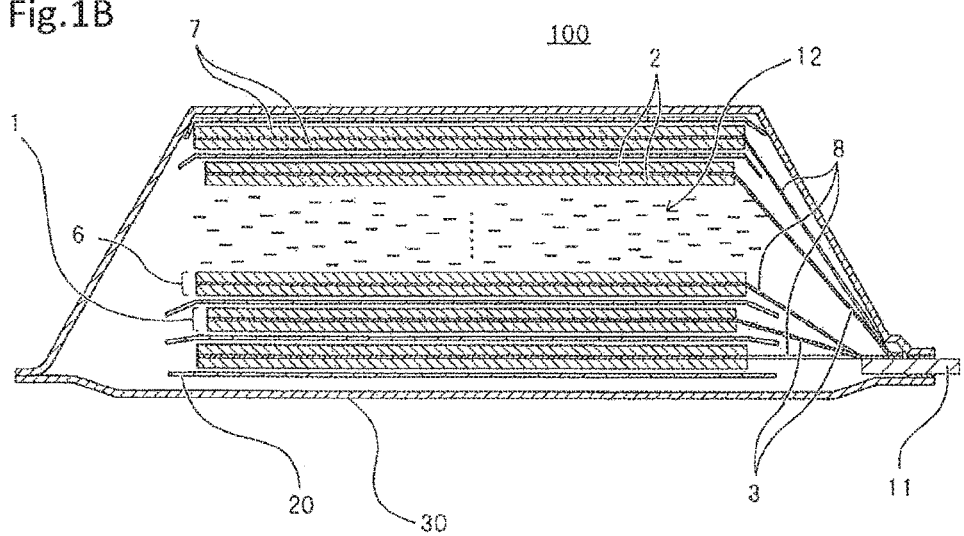
FIG. 1B is a sectional view cut along the line A-A illustrated in FIG. 1A.

FIGS. 1A and 1B schematically illustrate an example of the configuration of a laminated type lithium ion secondary battery adopting the present invention. Lithium ion secondary battery 100 according to the present invention includes an electrode laminate (battery electrode assembly) in which positive electrodes (positive electrode sheets) 1 and negative electrodes (negative electrode sheets) 6 are alternately laminated, with separators 20 interposed therebetween. The electrode laminate is housed together with electrolyte 12 in an exterior container formed of flexible film 30. One end of positive electrode terminal 11 is connected to positive electrode 1 of the electrode laminate, one end of negative electrode terminal 16 is connected to negative electrode 6, and the other end side of positive electrode terminal 11 and the other end side of negative electrode terminal 16 are drawn to the outside of flexible film 30. FIG. 1B illustrates the electrolyte by omitting a part (layer located in intermediate part in thickness direction) constituting the electrode laminate.

Positive electrode 1 includes positive electrode collector 3 and positive electrode active material layer 2 formed on positive electrode collector 3. In the front surface and the rear surface of positive electrode collector 3, a coated part on which positive electrode active material layer 2 is formed and an uncoated part on which no positive electrode active material layer 2 is formed are located side by side in a longitudinal direction. Similarly, negative electrode 6 includes negative electrode collector 8 and negative electrode active material layer 7 formed on negative positive electrode collector 8. In the front surface and the rear surface of negative electrode collector 8, a coated part and an uncoated part are located side by side in the longitudinal direction. The end part (outer edge part) of the coated part (positive electrode active material layer 2) that borders the portion with the uncoated part may slightly incline, or steeply rise substantially vertically to positive electrode collector 3. In negative electrode 6, similarly, the end of the coated part (negative electrode active material layer 8) may slightly incline, or steeply rise substantially vertically to negative electrode collector 7.

The uncoated part of each of positive electrode 1 and negative electrode 6 is used as a tab for connection to an electrode terminal (positive electrode terminal 11 or negative electrode terminal 16). Positive electrode tabs connected to positive electrode 1 are collected on positive electrode terminal 11, and interconnected integrally with positive electrode terminal 11 by ultrasonic welding or the like. Negative electrode tabs connected to negative electrode 6 are collected on negative electrode terminal 16, and interconnected integrally with negative electrode terminal 16 by ultrasonic welding or the like. Then, the other end part of positive electrode terminal 11 and the other end of negative electrode terminal 16 are respectively drawn to the outside of the exterior container.

Figure 2:
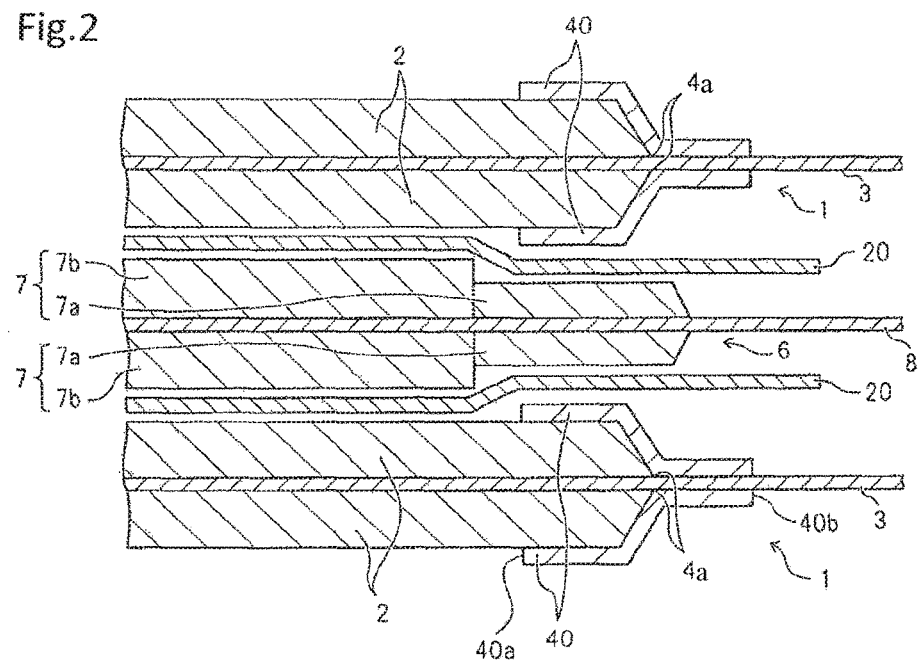
FIG. 2 is a sectional view illustrating the main portion of the secondary battery illustrated in FIGS. 1A and 1B.

As illustrated in FIG. 2, insulating member 40 for preventing a short circuit with negative electrode terminal 16 is formed so as to cover boundary portion 4a between the coated part and the uncoated part of positive electrode 1. Insulating member 40 is preferably formed over both the positive electrode tab (part of positive electrode collector not coated with positive electrode active material 2) and positive electrode material 2 to cover boundary portion 4a.

The external size of the coated part (negative electrode active material layer 7) of negative electrode 6 is larger than that of the coated part (positive electrode active material layer 2) of positive electrode 1, and smaller than that of separator 20. Negative electrode active material layer 7 includes high density part 7a located in at least a part of an outer peripheral portion, in the outer edge portion of the coated part in this example, and has a small thickness and a high density. Insulating member 40 of positive electrode 1 and high density part 7a of negative electrode active material layer 7 will be described below.

In this secondary battery, as materials for positive electrode active material layer 2, for example, there can be cited a layered oxide based material such as $LiCoO_2$, $LiNiO_2$, $LiNI_{(1-x)}CoO_2$, $LiNi_x(CoAl)_{(1-x)}O_2$, $Li_2MnO_3$-$LiMO_2$ (here, M is transition metal, e.g., Ni, Co, Fe, or Cr), or $LiNi_xCo_yMn_{(1-x-y)}O_2$, a spinel based material such as $LiMn_2O_4$, $LiMn_{1.5}Ni_{0.5}O_4$, or $LiMn_{(2-x)}M_xO_4$, an olivine based material such as $LiMPO_4$, an olivine fluoride based material such as $Li_2MPO_4F$, $Li_2MSiO_4F$, and a vanadium oxide based material such as $V_2O_5$, and one, or a mixture of two or more of these materials can be used.

As a material for negative electrode active material layer 7, a carbon material such as graphite, amorphous carbon, diamond like carbon, fullerene, carbon nanotube, or carbon nanohorn, a lithium metallic material, an alloy based material such as silicon or tin, an oxide based material such as $Nb_2O_5$ or $TiO_2$, or a compound formed of these materials can be used.

Materials for positive electrode active material layer 2 and negative electrode active material layer 7 may be mixed agents to which binders, conductive auxiliary agents or the like are added as occasion demands. As the conductive auxiliary agent, one or a combination of two or more from among carbon black, a carbon fiber, and graphite can be used. As the binder, polyvinylidene fluoride (PVDF), polytetrafluoroethylene, carboxymethyl cellulose, or modified acrylonitrile rubber particles can be used.

For positive electrode collector 3, aluminum, stainless steel, nickel, titanium, or an alloy of these can be used, and aluminum is particularly preferable. For negative electrode collector 8, copper, stainless steel, nickel, titanium, or an alloy of these can be used.

For electrolyte 12, one or a mixture of two or more of organic solvents including cyclic carbonates such as ethylene carbonate, propylene carbonate, vinylene carbonate or butylene carbonate, chain carbonates such as ethyl methyl carbonate (EMC), diethyl carbonate (DEC), dimethyl carbonate (DMC), or dipropyl carbonate (DPC), aliphatic carboxylic acid esters, γ-lactones such as γ-butyrolactone, chain ethers, and cyclic ethers can be used. Further, lithium salts can be dissolved in such an organic solvent.

Separator 20 mainly includes a resin porous film, a woven fabric, an unwoven fabric or the like, and as a resin component, for example, a polyolefin resin such as polypropylene or polyethylene, a polyester resin, an acrylic resin, a styrene resin, a nylon resin or the like can be used. A polyolefin microporous film is particularly preferable because of its high ion permeability and strong capability to physically isolate the positive electrode and the negative electrode from each other. When necessary, a layer including inorganic particles may be formed in separator 20, and the inorganic particles may be an insulating oxide, a nitride, a sulphide, or a carbide, and preferably include $TiO_2$ or $Al_2O_3$.

For the exterior container, a case including flexible film 30, a can case or the like can be used, and flexible film 30 is preferably used from the standpoint of achieving light battery weight. For flexible film 30, a film having resin layers formed on the front surface and the rear surface of a metal layer that is a base material can be used. For the metal layer, a barrier layer that prevents leakage of electrolyte 12 or the incursion of moisture from the outside can be selected, and aluminum or stainless steel can be used. A heat-fusible resin layer such as modified polyolefin is provided in at least one surface of the metal layer. The exterior container is formed by arranging the heat-fusible resin layers of flexible film 30 oppositely to each other and by heat-fusing the surroundings of the housing portion for the electrode laminate. A resin layer such as a nylon film or a polyester film can be provided on the surface of the exterior container opposite to the surface in which the heat-fusible resin layer has been formed.

A terminal made of aluminum or an aluminum alloy can be used for positive electrode terminal 11, and a terminal made of copper or a copper alloy, or plated with nickel can be used for negative electrode terminal 16. The other end sides of respective terminals 11 and 16 are drawn to the outside of the exterior container. In the places of respective terminals 11 and 16 corresponding to the heat-fused parts of the outer peripheral portion of the exterior container, heat-fusible resin layers can be provided in advance.

For insulating member 40 formed to cover boundary portion 4a between the coated part and the uncoated part of positive electrode active material 2, polyimide, a glass fiber, polyester, or polypropylene, or a material including these material can be used. Insulating member 40 can be formed by adding heat to a tape-like resin member to weld it to boundary portion 4a or by applying gel resin 12 to boundary portion 4a to dry it.

[Detailed Structures of Positive Electrode and Negative Electrode]

FIG. 2 is a schematic sectional view illustrating a lithium ion secondary battery according to an exemplary embodiment of the present invention in which only a part of an electrode laminate is schematically shown by enlargement.

Though omitted in FIGS. 1A and 1B, in both front and rear surfaces of negative electrode collector 8, a part of the outer peripheral portion of the coated part of negative electrode active material layer 7 (outer edge part adjacent to uncoated part) is high density part 7a whose thickness is smaller and whose density is higher than other part (thick layer part) 7b of the coated part. As an example, thick layer part 7b other than high density part 7a of negative electrode active material layer 7 has a thickness which is not less than 50 μm and not more than 70 μm and an average density which is not less than 1.4 g/cm$^3$ (1400 kg/m$^3$) and not more than 1.5 g/cm$^3$ (1500 kg/m$^3$). High density part 7a is thinner than other part 7b, and has a thickness which is not less than 41.5 μm and not more than 67.5 μm and an average density which is not less than 1.55 g/cm$^3$ (1550 kg/m$^3$) and not more than 1.75 g/cm$^3$ (1750 kg/m$^3$). The density of thick layer part 7b is set such that the amount of lithium ion and active material enables improved battery performance. On the other hand, the density of high density part 7a is set within a range that provides enables reducing lithium ion incursion and that enables better compression of negative electrode active material layer 7 during a re-pressurizing step (range not obstructing work). Note, however, that this is a condition when negative electrode active material layer 7 that mainly contains carbon is formed. When negative electrode active material layer 7 including Si or Sn in place of carbon is formed, the average density of thick layer part 7b may be set to about 1.3 g/cm$^3$ (1300 kg/m$^3$), and the average density of high density part 7a may be set to about 1.5 g/cm$^3$ (1500 kg/m$^3$). In any case, the average density of high density part 7a is preferably not less than 110% and not more than 125% (not less than 1.1 times and not more than 1.25 times larger) of the average density of thick layer part 7b.

High density part 7a is provided at a position planarly overlapping a part of insulating member 40 attached to positive electrode 1, specifically, a part of insulating member 40 located on the coated part (positive electrode active material layer 2). In other words, insulating member 40 of positive electrode 1 is present not at the position facing thick layer part 7b of negative electrode active material layer 6 of negative electrode 6, but is present at a position facing thin high density part 7a and the uncoated part. Accordingly, an increase in thickness caused by using insulating member 40 is absorbed (canceled) by a reduction in the thickness of negative electrode active material layer 7 caused by high density part 7a, thus preventing a partial increase in thickness of the electrode laminate caused by insulating member 40. Thus, pressure can be uniformly applied to the electrode laminate that is to be held, and a deterioration in quality such as variability in the electric characteristics or reduced cycle characteristics can be reduced.

Figure 3A:
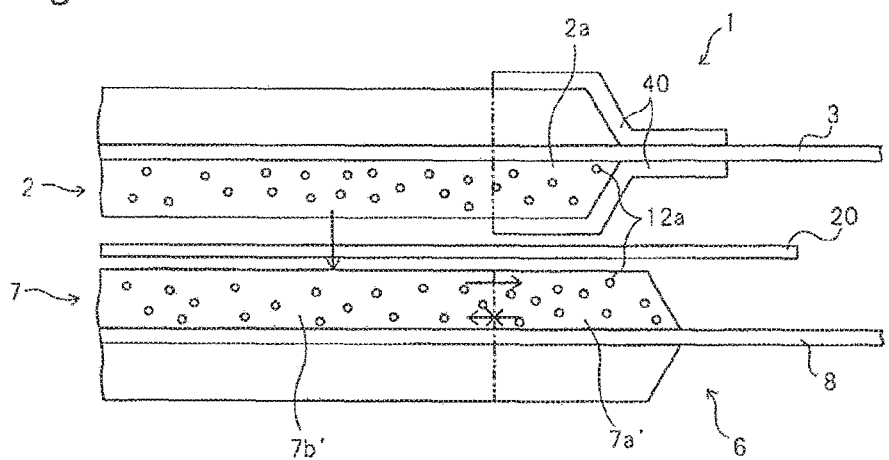
FIG. 3A is a schematic diagram illustrating the movement of ions in a secondary battery according to the related art.
Figure 3B:
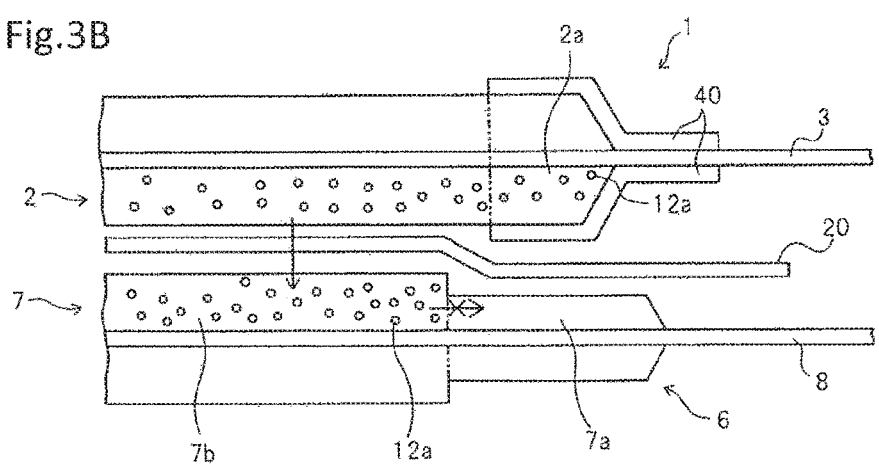
FIG. 3B is a schematic diagram illustrating the movement of ions in the secondary battery illustrated in FIG. 2.

Further, according to the exemplary embodiment, high density part 7a enables improvement in the performance of the secondary battery. This improvement will be described referring to FIGS. 3A and 3B. FIGS. 3A and 3B schematically illustrate ion (Li ion) 12a in electrolyte 12 in positive electrode active material layer 2 and negative electrode active material layer 7 facing each other via separator 20. Since portion 2a in which insulating member 40 is disposed on positive electrode active material layer 2 is covered with insulating member 40, ion 12a cannot enter or exit via insulating member 40. Thus, portion (referred to as "insulating member covered portion") 2a of positive electrode active material layer 2 covered with insulating member 40 and portion (referred to as "insulating member opposite portion") 7a' of negative electrode active material layer 7 facing portion 2a do not contribute to charging or discharging and do not function as a battery. When ion (Li ion) 12a enters insulating member opposite portion 7a' of negative electrode active material layer 7 as illustrated in FIG. 3A, insulating member opposite portion 7a' does not function as a battery as described above. In addition, the ions dispersed in insulating member opposite portion 7a' cannot reverse back to a portion that does not face insulating member 40 (insulating member non-opposite portion) 7b', but the ions are retained in insulating member opposite portion 7a'. In other words, some ions of electrolyte 12 housed in the exterior container do not contribute to the battery function in insulating member opposite portion 7a' and therefore are wasted. Though not illustrated, in the case of a configuration where insulating member covered portion 2a of positive electrode active material layer 2 is thin as described in Patent Document 2, similarly, there is a problem of an increase in waste of the electrolyte caused by dispersion of ions in insulating member opposite portion 7a' of negative electrode active material layer 7.

Therefore, according to the exemplary embodiment, as illustrated in FIGS. 2 and 3B, the portion facing insulating material covered portion 2a of positive electrode active material layer 2 and not contributing to a battery function is set as high density part 7a high in density. High density part 7a has a small number of gaps through which ion 12a can enter because of its high density, and the entry of ion 12a is limited. Thus, according to the exemplary embodiment, as the entry of ions into the portion of negative electrode active material layer 7 not contributing to the battery function is limited, the amount of wasted electrolyte 12 can be reduced. This improves the utilization efficiency of electrolyte 12 to provide the effect of improving electric characteristics or prolonging the life of the battery.

As described above, according to the exemplary embodiment, by thinning a part (high density part 7a) of the outer peripheral portion of negative electrode active material layer 7, the amount of thickness increase of the entire battery electrode assembly is reduced, the energy density per volume is increased, and pressure can be uniformly applied to the battery electrode assembly, and variability in the electric characteristics or a reduced cycle characteristics can be prevented. In addition, in the exemplary embodiment, this part (high density part) 7a is set to a high density so that the entry of ion 12a into high density part 7a is physically reduced, and this is a totally novel technical idea. This technical idea further provides an advantage in which electrolyte 12 is prevented from being wasted which leads to improved electric characteristics or improved battery cycle life.

The length of high density part 7a along the longitudinal direction of negative electrode 6 (horizontal direction in FIGS. 1A to 3B) is preferably not less than about 2 mm and not more than about 5 mm. The reason for this is because the length of insulating member 40 attached to positive electrode 1 is normally about 3 mm, when the length of high density part 7a is less than 2 mm, insulation cannot be maintained due to positional shifting and, when the length of high density part 7a is more than 5 mm, the waste of a battery capacity will increase.

[Manufacturing Method of Secondary Battery]

The manufacturing method of the secondary battery illustrated in FIGS. 1A to 2 will be described.

Figure 4:
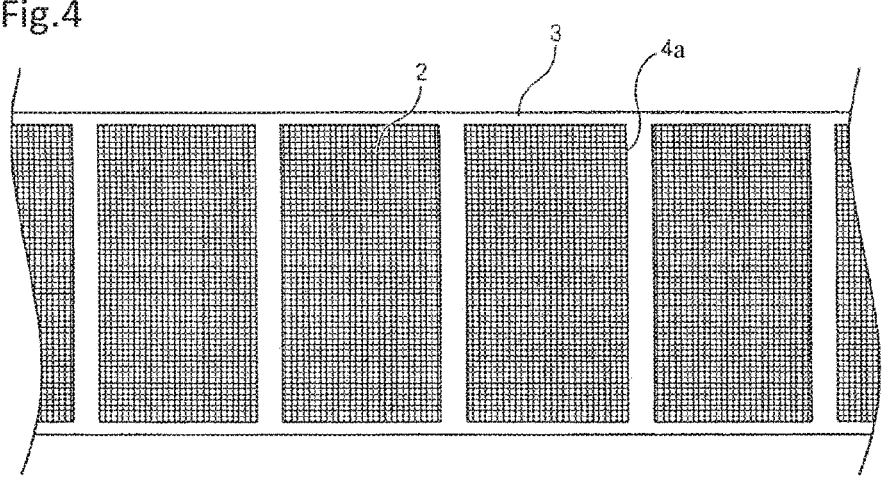
FIG. 4 is a plan view illustrating the positive electrode forming step of a secondary battery manufacturing method according to the present invention.
Figure 5:
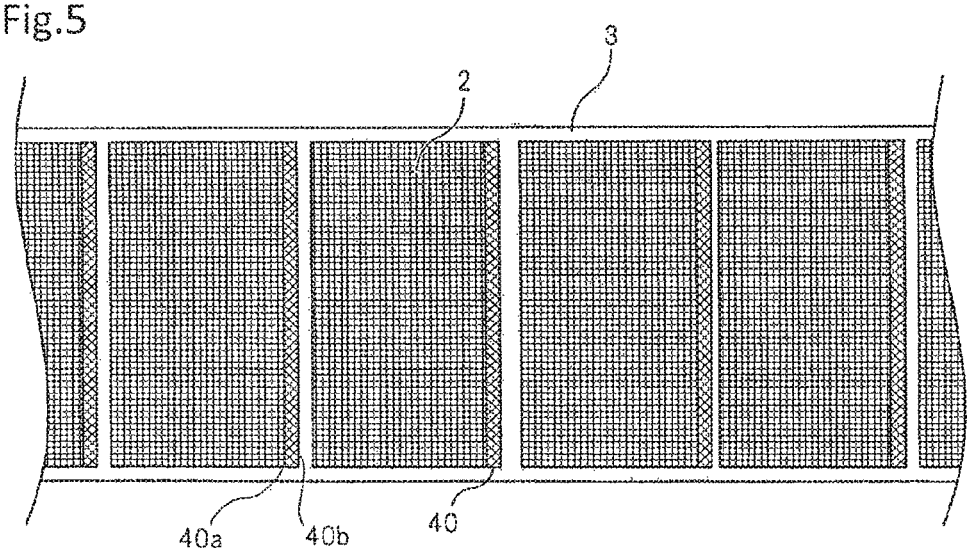
FIG. 5 is a plan view illustrating a step of the secondary battery manufacturing method according to the present invention, following the step illustrated in FIG. 4.

First, as illustrated in FIG. 4, positive electrode active material layers 2 are intermittently formed on the front surface of long strip positive electrode collector 3 for manufacturing a plurality of positive electrodes (positive electrode sheets) 1. Then, as illustrated in FIG. 5, insulating member 40 is disposed so that one end 40a is positioned on each coated part (positive electrode active material layer 2) and other end 40b is positioned on each uncoated part (positive electrode collector 3). Similarly, positive electrode active material layers 2 are intermittently formed on the rear surface of positive electrode collector 3, and insulating member 40 is disposed so that one end 40a is positioned on each coated part and other end 40b is positioned on each uncoated part.

Because sufficient insulation may not be secured when the thickness of insulating member 40 is small, the thickness is preferably set to 10 μm or more. When the thickness of insulating member 40 is excessively large, the effect of reducing the amount of thickness increase of the electrode laminate provided by the present invention is not sufficiently exhibited, and thus the thickness of insulating member 40 is preferably set smaller than the average thickness of positive electrode active material layer 2. The thickness of insulating member 40 is preferably 90% or less of the average thickness of positive electrode active material layer 2, more preferably 60% or less.

Figure 6A:
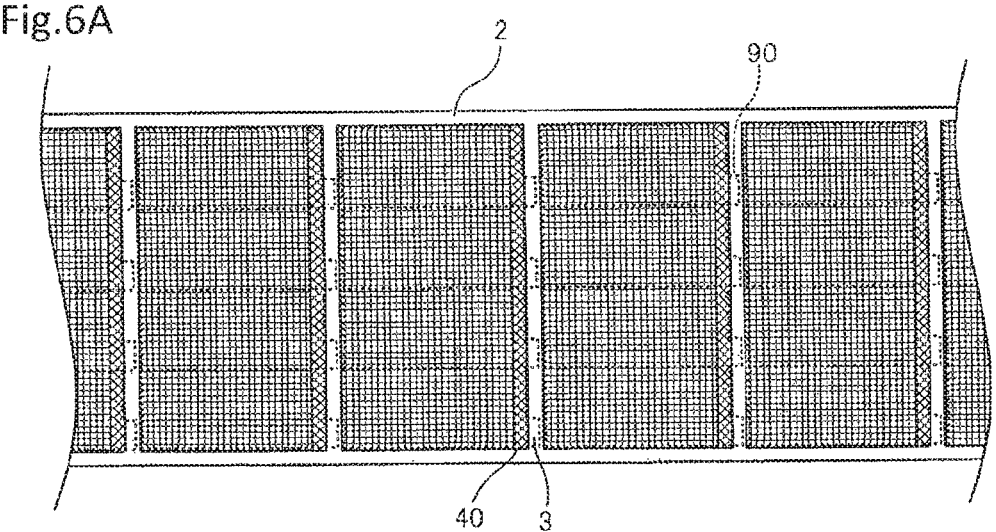
FIG. 6A is a plan view illustrating a step of the secondary battery manufacturing method according to the present invention, following the step illustrated in FIG. 5.
Figure 6B:
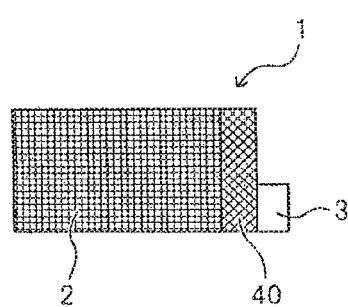
FIG. 6B is a plan view illustrating a positive electrode that is cut to be formed in the step illustrated in FIG. 6A.

Then, in order to obtain positive electrode 1 used for each laminated type battery, positive electrode collector 3 is cut along cutting line 90 indicated by a broken line illustrated in FIG. 6A to be divided, thereby obtaining positive electrode 1 of a desired size illustrated in FIG. 6B. Cutting line 90 is a virtual line, not formed in reality.

Figure 7:
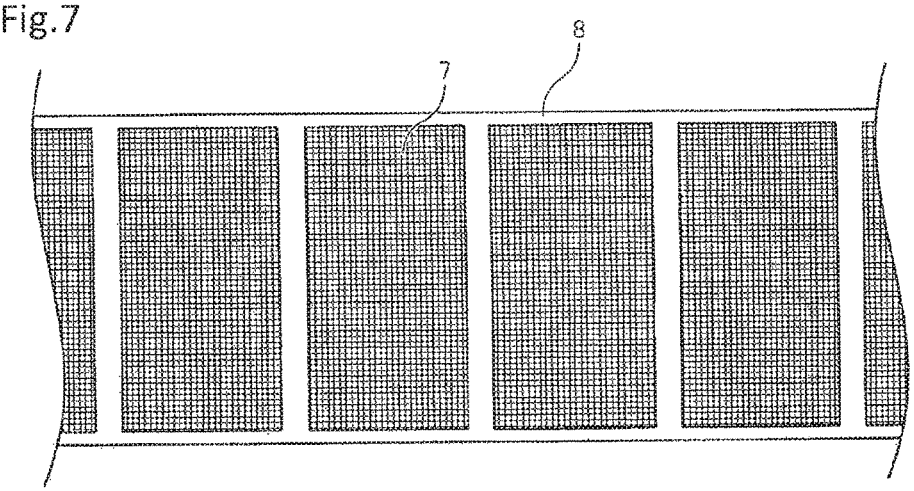
FIG. 7 is a plan view illustrating the negative electrode forming step of the secondary battery manufacturing method according to the present invention.
Figure 8:
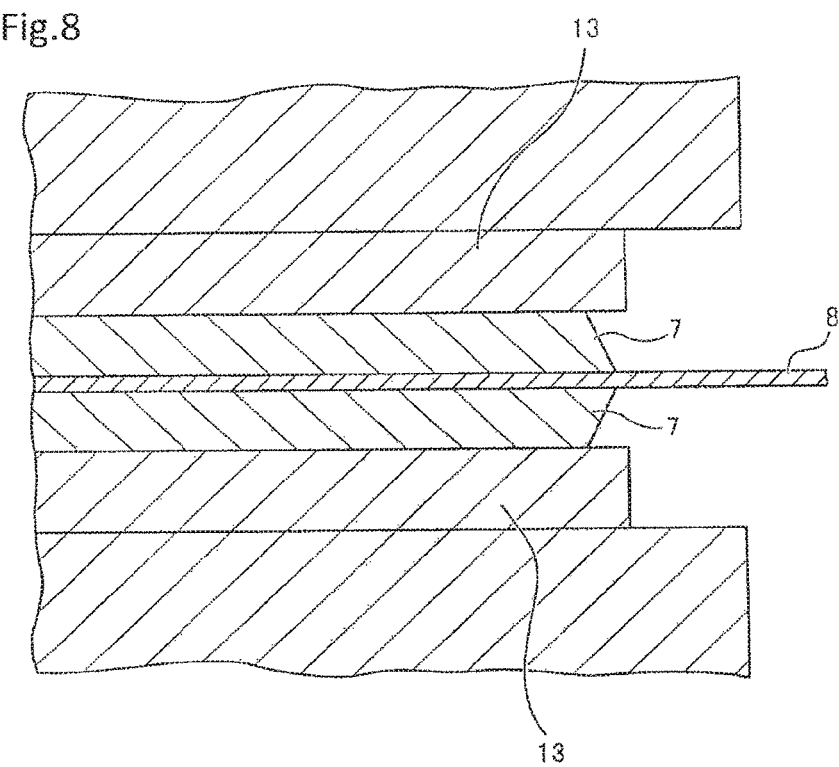
FIG. 8 is a sectional view illustrating a pressurizing step of the secondary battery manufacturing method according to the present invention, following the step illustrated in FIG. 7.

As illustrated in FIG. 7, negative electrode active material layers 7 are intermittently formed on the front surface of long strip negative electrode collector 8 for manufacturing a plurality of negative electrodes (negative electrode sheets) 6. Similarly, negative electrode active material layers 7 are intermittently formed on the rear surface of negative electrode collector 8. Then, as illustrated in FIG. 2, high density part 7a is formed by ensuring that the thickness of a part of negative electrode active material layer 7 is small and that the density is high. Specifically, as illustrated in FIG. 8, entire negative electrode active material layers 7 on both surfaces of negative electrode collector 8 are simultaneously compressed by pressing means 13. At the point of this time, the thickness of negative electrode active material layer 7 is not less than 50 μm and not more than 70 μm, and the average density is not less than 1.4 g/cm$^3$ and not more than 1.5 g/cm$^3$ (preferably not less than 110% and not more than 125% of average density of thick layer part).

Figure 9:
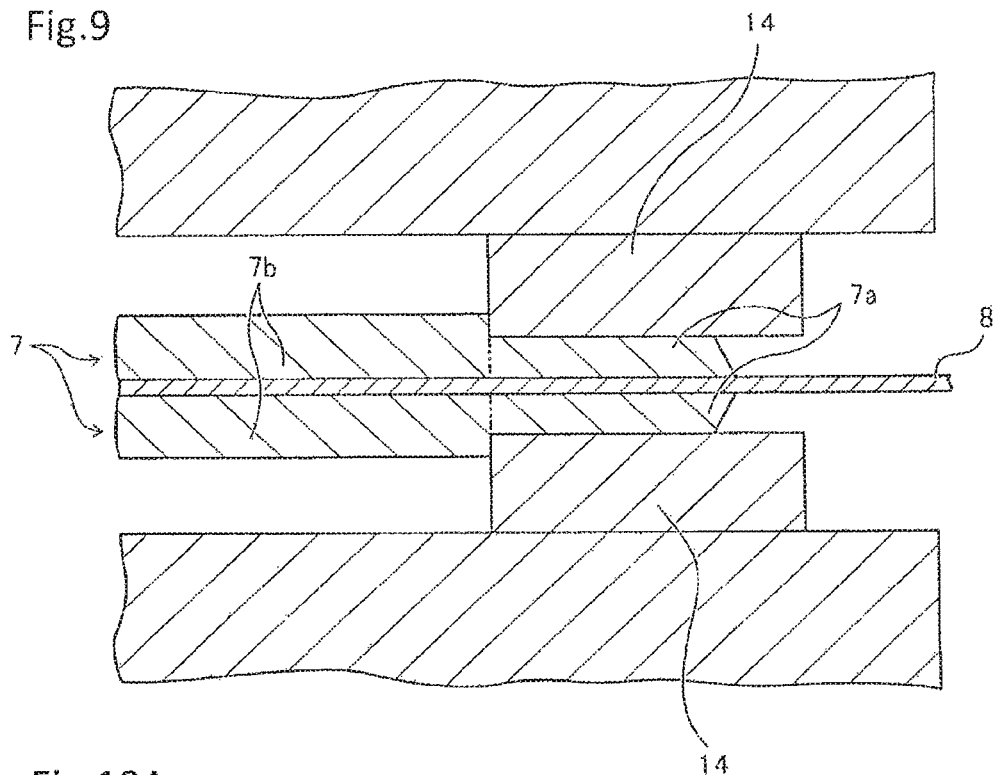
FIG. 9 is a sectional view illustrating a re-pressurizing step of the secondary battery manufacturing method according to the present invention, following the step illustrated in FIG. 8.

Then, as illustrated in FIG. 9, a part of the outer peripheral portion of negative electrode active material layer 7 (coated part) is further compressed by pressing means 14, thereby forming high density part 7a. As a result of this compression, the thickness of high density part 7a becomes smaller than that of other part (not re-pressed thick layer part) 7b, and is not less than 41.5 μm and not more than 67.5 μm, and the average density of high density part 7a is not less than 1.55 g/cm$^3$ and not more than 1.75 g/cm$^3$. A position (re-pressing position) at which high density part 7a is formed is a position opposite to the portion of insulating member 40 provided on positive electrode 1, which is positioned on positive electrode active material layer 2 at the completion time of the battery electrode assembly described below.

Figure 10A:
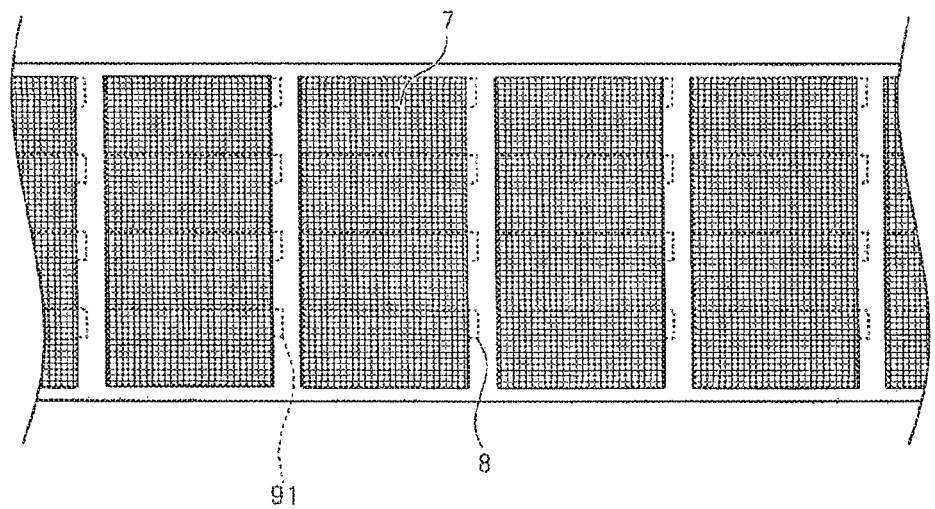
FIG. 10A is a plan view illustrating a step of the secondary battery manufacturing method according to the present invention, following the step illustrated in FIG. 9.
Figure 10B:
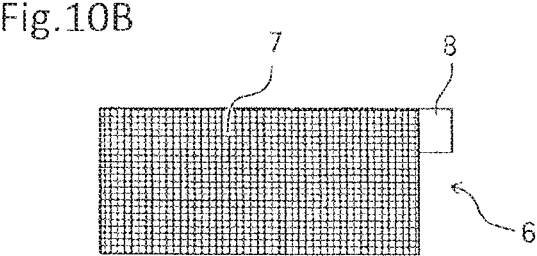
FIG. 10B is a plan view illustrating a negative electrode that is cut to be formed in the step illustrated in FIG. 10A.

Then, in order to obtain negative electrode 6 used for each laminated type battery, negative electrode collector 8 is cut along cutting line 91 indicated by a broken line illustrated in FIG. 10A to be divided, thereby obtaining negative electrode 6 of a desired size illustrated in FIG. 10B. Cutting line 91 is only a virtual line and does not, in fact, exist.

Positive electrode 1 illustrated in FIG. 6B and negative electrode 6 illustrated in FIG. 10B, formed in the aforementioned manner, are alternately laminated with separator 20 interposed therebetween, and positive electrode terminal 11 and negative electrode terminal 16 are interconnected to form the electrode laminate illustrated in FIG. 2. This electrode laminate is housed together with electrolyte 12 in the exterior container including flexible film 30 and sealed, thereby forming secondary battery 100 illustrated in FIGS. 1A and 1B. In secondary battery 100 of the present invention thus formed, insulating member 40 is provided over the coated part and the uncoated part of positive electrode 1, one end part 40a is at a position opposite to high density part 7a of negative electrode active material layer 7 on positive electrode active material layer 2, and other end part 40b is on positive electrode collector 3 (on uncoated part). The amount of thickness of negative electrode active material layer 7 that is reduced by high density part 7a, in other words, the difference in thickness between high density part 7a and thick layer part 7b, is preferably set to be larger than the thickness of insulating member 40.

Figure 11:
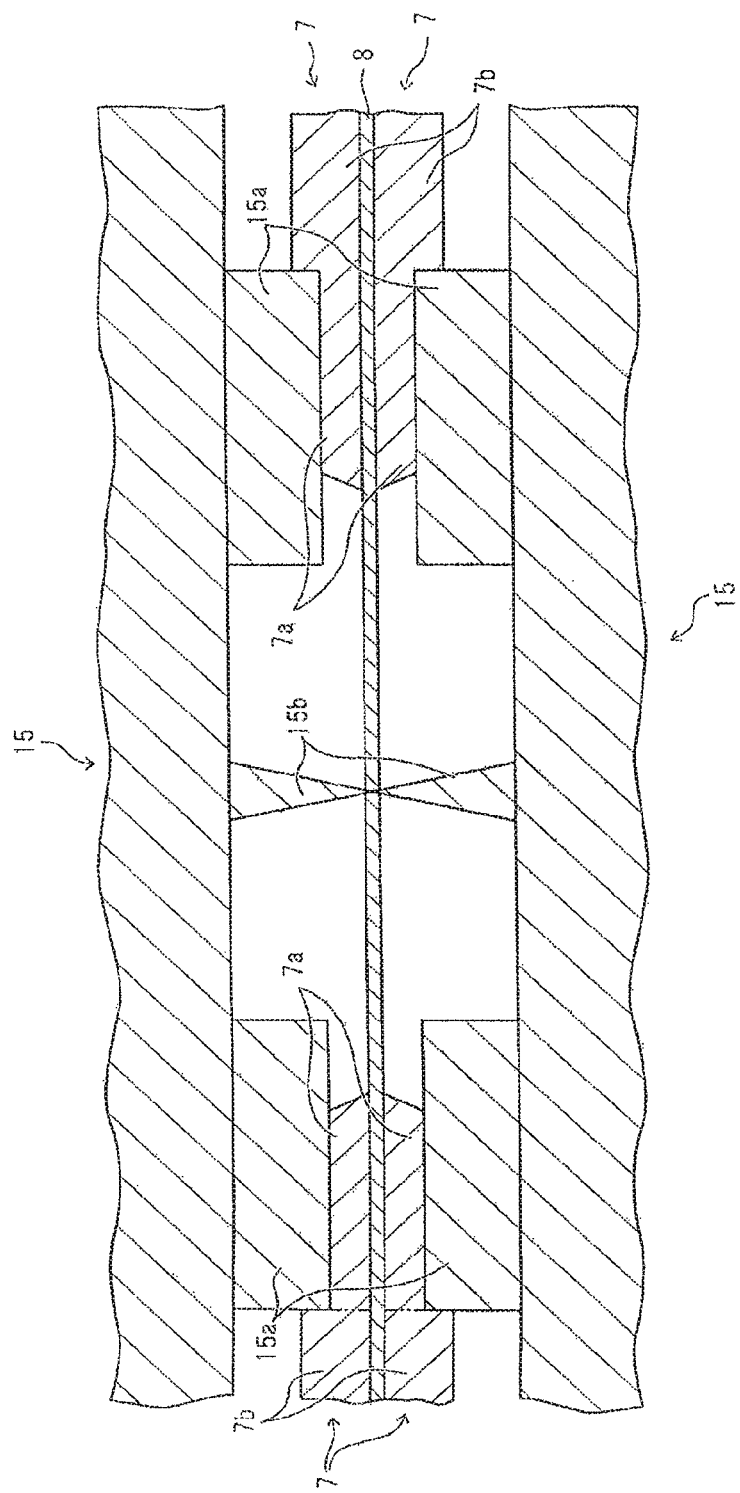
FIG. 11 is a sectional view illustrating the step of simultaneously carrying out re-pressurization and cutting in another example of the secondary battery manufacturing method according to the present invention.

The step of forming high density part 7a by re-pressing at least a part of the outer peripheral portion of negative electrode active material layer 7 (coated part) and the step of cutting and dividing negative electrode collector 8 can be simultaneously carried out. For example, as illustrated in FIG. 11, by pressing means 15 having pressing part 15a for re-pressing and cutter part 15b for cutting, parts of the outer peripheral portions of negative electrode active material layers 7 on both surfaces of negative electrode collector 8 are re-pressed to form high density parts 7a, and simultaneously negative electrode collector 8 is cut along the contour of negative electrode 6 to be manufactured. Thus, when the re-pressing step that is a novel feature of the present invention is carried out simultaneously with the cutting step that is an essential step to form a negative electrode, the aforementioned effect of the present invention can be exhibited and, as the re-pressing does not increase the number of steps, an increase in work time and manufacturing cost for forming negative electrode 6 can be prevented.

In the example illustrated in FIG. 11, negative electrode active material layers 7 adjacent to each other in long negative electrode collector 8 are arranged so that the uncoated parts can face each other. Not limited to this arrangement, however, even when negative electrode active material layers 7 are arranged to face in the same direction as in the case of the configuration illustrated in FIG. 10A, the re-pressing step and the cutting step can be simultaneously carried out by partially changing the configuration of pressing means 15.

MODIFIED EXAMPLE

Figure 12A:
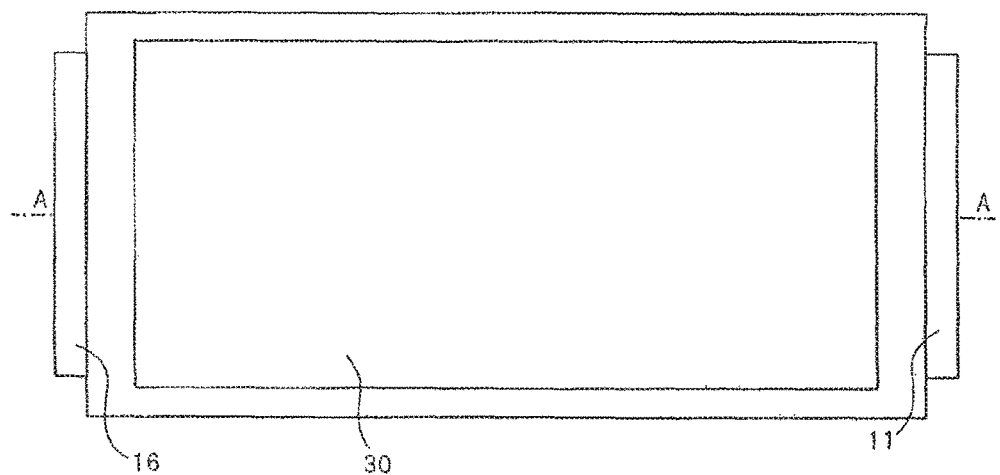
FIG. 12A is a plan view illustrating a modified example of the basic structure of the secondary battery illustrated in FIGS. 1A and 1B.
Figure 12B:
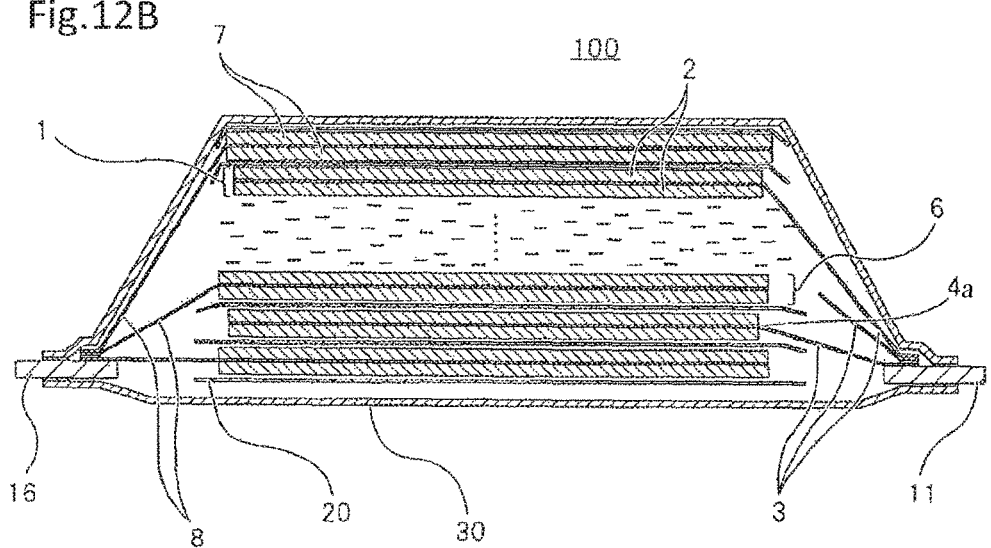
FIG. 12B is a sectional view cut along the line A-A illustrated in FIG. 12A.
Figure 13:
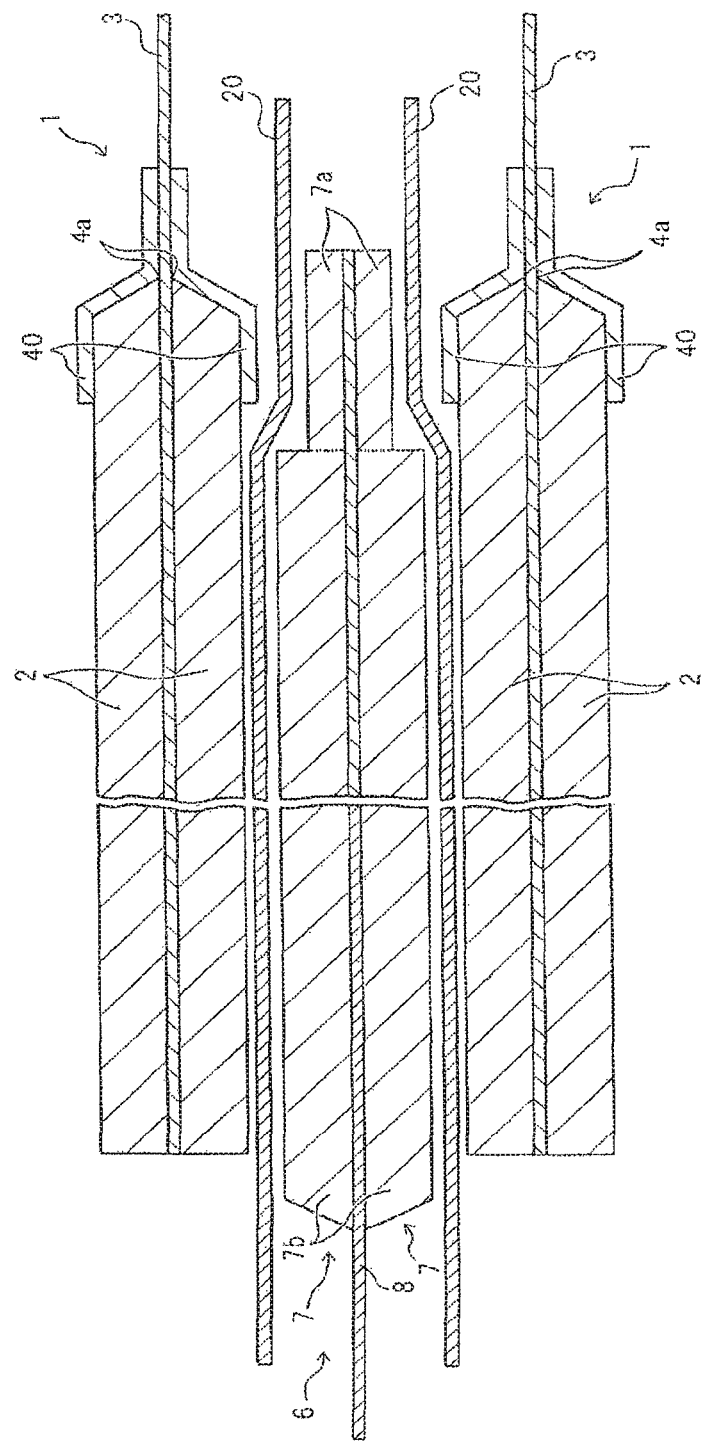
FIG. 13 is a sectional view illustrating the main portion of the secondary battery illustrated in FIGS. 12A and 12B.

FIGS. 12A to 13 illustrate the modified example of the exemplary embodiment. In the modified example, different from the configuration illustrated in FIGS. 1A to 2, positive electrode terminal 11 and negative electrode terminal 16 do not project in the same direction from the exterior container, but project in opposing directions. In this configuration, as the uncoated part of negative electrode active material layer 7 is not provided in a region planarly overlapping a region in which the uncoated part of positive electrode 1 is provided, positive electrode terminal 11 and negative electrode terminal 16 can be increased in area without any possibility of a short circuit, and the reliability of electric connection can be improved.

Other Exemplary Embodiments

Figure 14:
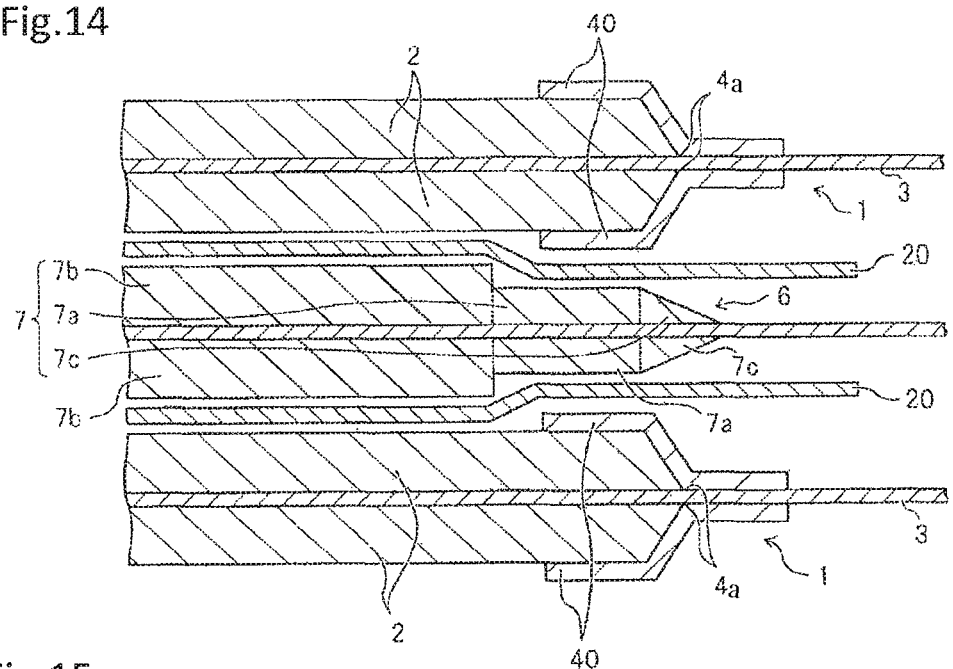
FIG. 14 is a sectional view illustrating the main portion of a laminated type secondary battery according to another exemplary embodiment of the present invention.
Figure 15:
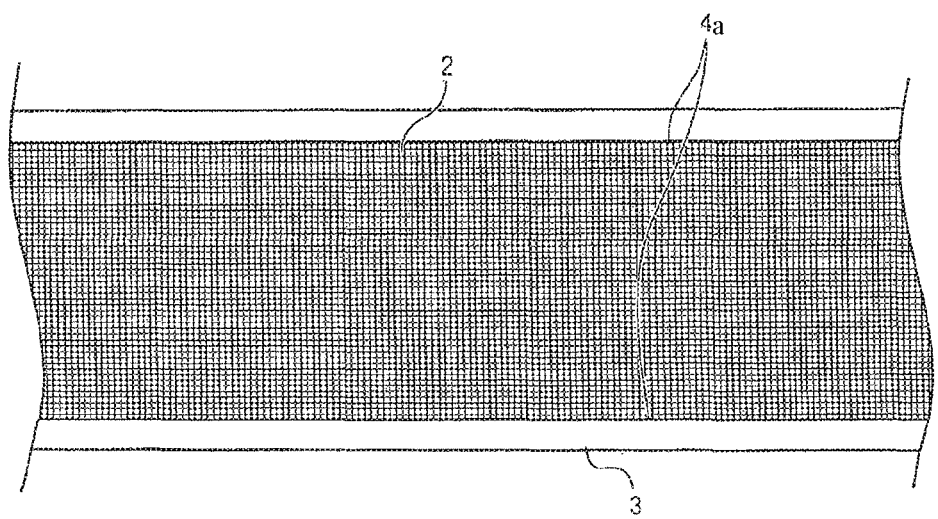
FIG. 15 is a plan view illustrating another example of the positive electrode forming step of a secondary battery manufacturing method according to the present invention.
Figure 16:
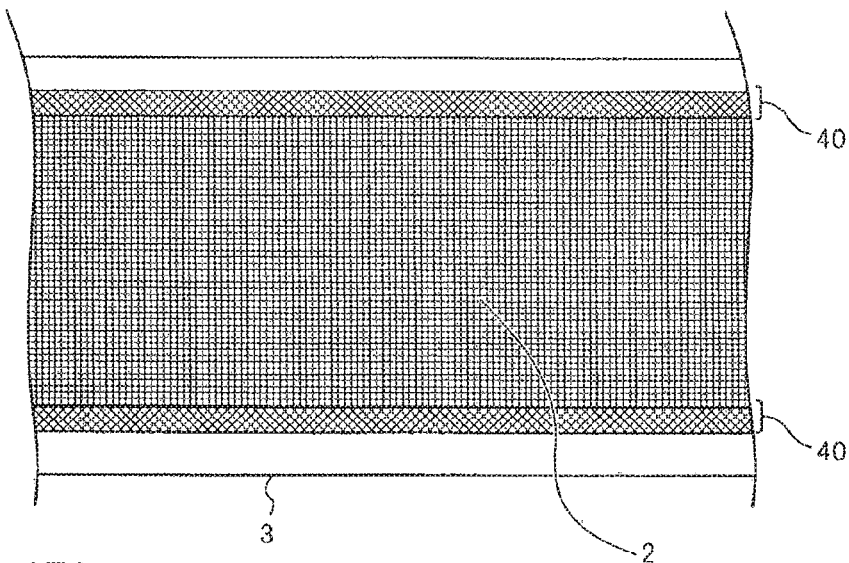
FIG. 16 is a plan view illustrating a step of the secondary battery manufacturing method according to the present invention, following the step illustrated in FIG. 15.
Figure 17A:
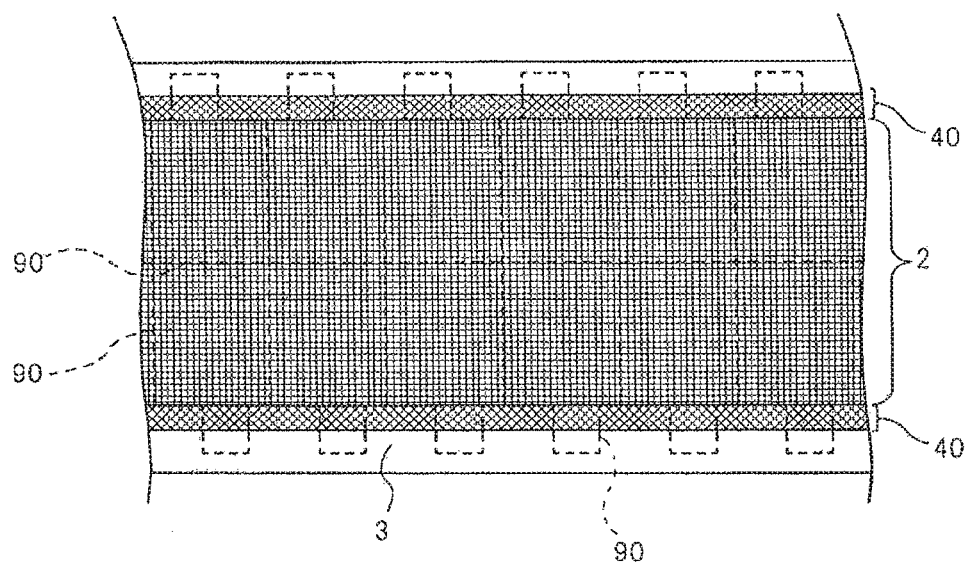
FIG. 17A is a plan view illustrating a step of the secondary battery manufacturing method according to the present invention, following the step illustrated in FIG. 16.
Figure 17B:
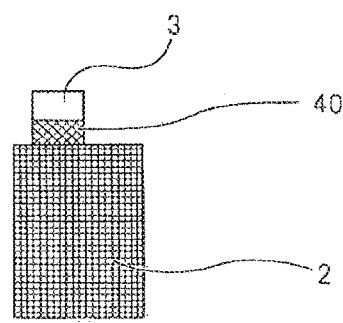
FIG. 17B is a plan view illustrating a positive electrode that is cut to be formed in the step illustrated in FIG. 17A.

In the exemplary embodiment illustrated in FIGS. 1A to 13, high density part 7a is provided at the outer edge part (end part) of negative electrode active material layer (coated part) 7. However, as illustrated in FIG. 14, non-high density part 7c small in thickness which is about equal to that of high density part 7a but not high in density can be provided at the outer edge part of negative electrode active material layer 7, and high density part 7a small in thickness but high in density can be provided in a part of the outer peripheral portion of the coated part more inside than non-high density part 7c of the outer edge part. As an example, the thickness of thick layer part (part other than high density part 7a and non-high density part 7c) 7b of negative electrode active material layer 7 is not less than 50 μm and not more than 70 μm, and the average density is not less than 1.4 g/cm$^3$ and not more than 1.5 g/cm$^3$. The thickness of high density part 7a is set smaller than that of thick layer part 7b, and is not less than 41.5 μm and not more than 67.5 μm, and the average density is not less than 1.55 g/cm$^3$ and not more than 1.75 g/cm$^3$. The thickness of non-high density part 7c positioned at the outer edge part of the coated part is 67.5 μm or less, which is equal to or less than the thickness of high density part 7a, and the average density is about equal to that of thick layer part 7a, namely, not less than 1.4 g/cm$^3$ and not more than 1.5 g/cm$^3$.

Similarly, in this exemplary embodiment, as the parts (high density part 7a and non-high density part 7c) of the outer peripheral portion of negative electrode active material layer 7 are small in thickness, an increase in thickness caused by insulating member 40 can be absorbed (canceled). Accordingly, the amount of thickness increase of the entire battery electrode assembly is reduced so that an energy density per volume increases, and pressure can be uniformly applied to the battery electrode assembly, thereby preventing variability in electric characteristics or a reduction in cycle characteristics. In addition, as the entry of ion 12a is prevented by high density part 7a, ion 12a does not enter non-high density part 7c through high density part 7a. Thus, as in the case of the aforementioned exemplary embodiment, electrolyte 12 can be prevented from being wasted, thereby improving electric characteristics or prolonging the life of the battery. In other words, even when high density part 7a is provided not at the outer edge part of the coated part (negative electrode active material layer 7) but at a position slightly inside, the effect of the present invention can be exhibited as long as the thickness of the outer edge part is smaller than that of thick layer part 7c.

Specifically, non-high density part 7c of the exemplary embodiment may be formed due to noncontact with a pressing member at the time of re-pressing, for example, when the outer edge part of the coated part is formed in an inclined shape during the manufacturing of negative electrode active material layer 7.

Example

Lithium ion secondary battery was manufactured according to the manufacturing method described above referring to FIGS. 4 to 11.
<Positive Electrode>
First, as a material for positive electrode active material layer 2, an active material mixing LiMn$_2$O$_4$ and LiNi$_{0.8}$Co$_{0.1}$Al$_{0.1}$O$_2$ was used, carbon black and PVDF were respectively used as a conductive agent and a binder, and a mixed agent of these was dispersed in an organic solvent to prepare slurry. As illustrated in FIG. 4, this slurry was intermittently applied on one surface of positive electrode collector 3 mainly made of aluminum and formed with a thickness of 20 μm and then dried to form positive electrode active material layer 2 having a thickness of 80 μm. Through the intermittent application of the slurry, the coated part and the uncoated part of positive electrode active material layer 2 were alternately arranged along the longitudinal direction of positive electrode collector 3. Similarly, positive electrode active material layer 2 having a thickness of 80 μm was formed on the other surface of positive electrode collector 3. The application of the slurry on positive electrode collector 3 can be carried out by using various coating devices such as a doctor blade, a die coater, a gravure coater, a transfer system, and a deposition system. After the formation of positive electrode active material layer 2 on positive electrode collector 3 in this manner, as illustrated in FIG. 5, polypropylene insulating tape (insulating member) 40 having a thickness of 30 μm was stuck to cover boundary portion 4a. Then, as illustrated in FIGS. 6A and 6B, cutting was carried out along cutting line 90 to obtain each positive electrode 1.
<Negative Electrode>
As a material for negative electrode active material layer 7, graphite having its surface covered with an amorphous material was used, PVDF was used as a binder, and a mixed agent of these was dispersed in an organic solvent to prepare slurry. As illustrated in FIG. 7, the slurry was intermittently applied on the copper foil of negative electrode collector 8 having a thickness of 15 μm and then dried, and as in the case of positive electrode 1, the coated part and the uncoated part of negative electrode active material layer 7 were alternately arranged along the longitudinal direction of negative electrode collector 8. The specific slurry application method of negative electrode 6 is similar to the aforementioned slurry application method of positive electrode 1.

Then as illustrated in FIG. 8, entire negative electrode active material layer 7 was pressed, and further re-pressed partially (part of outer peripheral portion) as illustrated in FIG. 9 to form high density part 7a small in thickness and high in density. Then, as illustrated in FIGS. 10A and 10B, cutting was carried out along cutting line 91 to obtain each negative electrode 6. Alternatively, as illustrated in FIG. 11, cutting was carried out simultaneously with the re-pressing of negative electrode active material layer 7 to obtain each negative electrode 6 illustrated in FIG. 10B.

<Manufacturing of Laminated Type Battery>

Positive electrode 20 (refer to FIG. 6B) and negative electrode 21 (refer to FIG. 10B) obtained in the aforementioned manner were laminated with polypropylene separator 20 having a thickness of 25 µm interposed therebetween, and negative electrode terminal 16 and positive electrode terminal 11 were attached to these electrodes, and housed in an exterior container including flexible film 30, thereby obtaining a laminated type battery. During the lamination of positive electrode 1 and negative electrode 6, positive electrode 1 and negative electrode 6 were aligned with each other so that the part of insulating member 40 positioned on positive electrode active material layer 2 faced high density part 7a of negative electrode 6, or faced high density part 7a or non-high density part 7c when non-high density part 7c was present.

Figure 18:
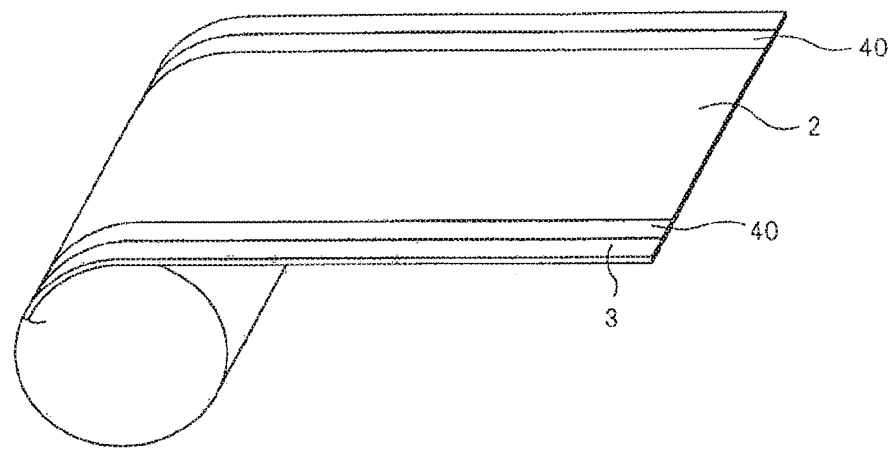
FIG. 18 is a plan view illustrating a step of the secondary battery manufacturing method according to the present invention, following the step illustrated in FIGS. 17A and 17B.
Figure 19:
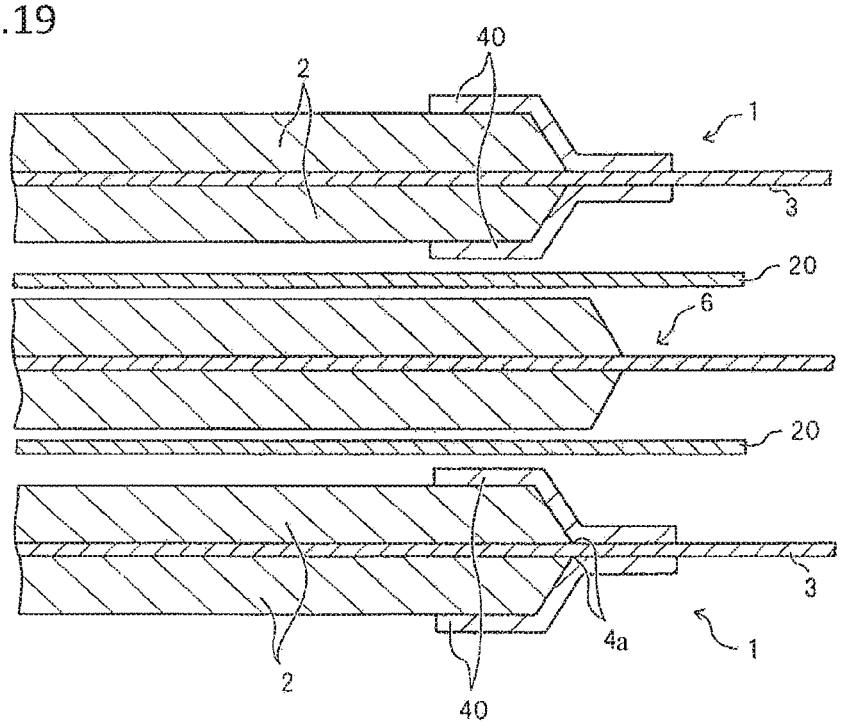
FIG. 19 is an enlarged sectional view illustrating the main portion of a laminated type secondary battery according to the related art.

In each of the aforementioned exemplary embodiments, positive electrode active material 2 and negative electrode active material 7 are formed by intermittent coating (intermittent application). However, as illustrated in FIGS. 15 to 17B, these layers may be formed by continuous coating (continuous application) for forming active material layers without any gaps over a plurality of electrode forming parts. When an active material layer is formed by the continuous coating, an electrode roll can be formed to be stored as illustrated in FIG. 18 before cutting along cutting line 90 illustrated in FIG. 17A. While FIGS. 15 to 18 illustrate the case of positive electrode 1, an electrode roll can be similarly formed for negative electrode 6. However, in the case of negative electrode 6, without providing insulating member 40, a roll shape is formed in a state where high density part 7a and in some cases non-high density part 7c are formed.

Each of the aforementioned exemplary embodiments adopts the configuration where insulating member 40 is provided in positive electrode 1. However, a configuration where insulating member 40 is provided in negative electrode 6 can be adopted. In such a case, the part of insulating member 40 positioned on negative electrode active material layer 7 is disposed on high density part 7a, or on high density part 7a or non-high density part 7c when non-high density part 7c is formed.

The present invention is useful for manufacturing the electrode of a lithium ion secondary battery and manufacturing a lithium ion secondary battery using the electrode. However, the invention can be advantageously used for a secondary battery other than lithium ion batteries.

The present invention has been described with reference to some exemplary embodiments. However, the present invention is not limited to the exemplary embodiments. Various changes understandable to those skilled in the art can be made of the configuration and details of the present invention within the scope of the technical idea of the invention.

This application claims priority from Japanese Patent Application No. 2014-38063 filed on Feb. 28, 2014, which is incorporated by reference herein in its entirety.

The invention claimed is:

1. An electrode for a secondary battery to be laminated with another type of electrode, with a separator interposed therebetween, to constitute a battery electrode assembly, which is comprised of a collector and an active material layer formed on the collector; comprising
a coated part in which the active material layer is formed on the collector; and
an uncoated part in which the active material layer is not formed on the collector,
wherein the active material layer comprises:
in at least a part of an outer peripheral portion of the coated part, a high density part having a smaller thickness and a higher density than those of a portion other than the outer peripheral portion, and
a non-high density part positioned at an outer edge part of the coated part, smaller in thickness than a portion other than the outer peripheral portion, and lower in density than the high density part,
wherein the high density part is positioned closer to the center than the non-high density part in the outer peripheral portion of the coated part.

2. The electrode for the secondary battery according to claim 1, the electrode being a negative electrode alternately laminated with a positive electrode that is the other type of electrode, with the separator interposed therebetween.

3. The electrode for the secondary battery according to claim 1, wherein the high density part is positioned at an outer edge part of the coated part.

4. The electrode for the secondary battery according to claim 1, wherein an average density of the high density part is not less than 110% and not more than 125% of an average density of the portion other than the outer peripheral portion.

5. The electrode for the secondary battery according to claim 1, wherein:
the part of the electrode other than the outer peripheral portion of the active material layer has a thickness which is not less than 50 µm and not more than 70 µm and an average density which is not less than 1400 kg/m$^3$ and not more than 1500 kg/m$^3$; and
the high density part is smaller in thickness than the part other than the outer peripheral portion, and has a thickness which is not less than 41.5 µm and not more than 67.5 µm and an average density which is not less than 1550 kg/m$^3$ and not more than 1750 kg/m$^3$.

6. The electrode for the secondary battery according to claim 5, wherein the active material layer is made of a material including carbon.

7. A secondary battery comprising:
a battery electrode assembly including the electrode for the secondary battery according to claim 1, which is used as a negative electrode, the separator, and a positive electrode alternately laminated with the negative electrode with the separator interposed therebetween;
an exterior container for housing the battery electrode assembly; and
an electrolyte housed together with the battery electrode assembly in the exterior container.

8. The secondary battery according to claim 7, wherein:
the positive electrode is comprised of a collector and an active material layer applied on the collector, and the positive electrode includes a coated part in which the active material layer is formed on the collector, and an uncoated part in which the active material layer is not formed on the collector;

an insulating member is disposed to cover a boundary portion between the coated part and the uncoated part; and the high density part of the negative electrode is provided at a position planarly overlapping a part of the insulating member.

9. The secondary battery according to claim 7, wherein:

the positive electrode is comprised of a collector and an active material layer applied on the collector, and the positive electrode includes a coated part in which the active material layer is formed on the collector, and an uncoated part in which the active material layer is not formed on the collector;

an insulating member is disposed to cover a boundary portion between the coated part and the uncoated part of the negative electrode; and the high density part is provided at a position planarly overlapping a part of the insulating member.

10. The secondary battery according to claim 7, the secondary battery being a lithium ion secondary battery.

* * * * *